May 25, 1943.    W. K. SIMPSON    2,320,104
ADAPTOR FOR VENT VALVES
Filed Nov. 17, 1939

Inventor
William K. Simpson
by Wright, Brown, Quinby & May
Attys.

Patented May 25, 1943

2,320,104

UNITED STATES PATENT OFFICE 2,320,104

ADAPTER FOR VENT VALVES

William K. Simpson, Waterbury, Conn., assignor to Hoffman Specialty Company, Waterbury, Conn., a corporation of Illinois Application November 17, 1939, Serial No. 304,955

6 Claims. (Cl. 137—122)

The present invention relates to steam heating systems and the means with which such systems are equipped for discharging air from radiators and other parts of the system, when steam is admitted to such parts after having been shut off, while preventing discharge of steam and water. More particularly it is concerned with provisions for adapting and connecting vent valves of the angle type or pattern to situations where the outlet for connection of a vent valve is in the top wall of a steam receiver; and for improving the venting action when the receiver "works water."

Vent valves for steam heating systems all comprise a casing having a vent port in its top portion and containing a valve element operated by a float and thermostatic means to close the port when the casing is occupied by live steam or water and to open the port when the casing is free of water and at a temperature somewhat below that of live steam. Vent valves of the angle type are characterized by a nipple projecting from the side of the casing and adapted to be mounted in an opening in the side of a steam radiator or equivalent receiver with the casing of the valve in upright position. Heating radiators of some types, such as the so-called convectors, have their openings for vent valve connections in the top wall at the highest point and substantially in a horizontal plane. The vent valves heretofore provided for use with such radiators have been of the so-called straight shank type, characterized by a connection nipple projecting from the bottom of the casing vertically when the valve is placed in operative position. A large variety of straight shank valves are needed to suit the requirements of radiators which are designed for this type of valve. Thus under conditions existing at the present time, straight shank valves with ⅛", ¼" and ¾" connections are required to meet market requirements. This requirement necessitates the manufacture, and maintenance in stock by distributors, of a large number of straight shank valves to meet all conditions, in addition to the angle shank valves which must be stocked also. Assuming, for example, that five designs of vent valve are needed to meet all the conditions and problems of venting steam heating systems, such designs may be embodied in an equal number of angle valves, all of which have nipples or shanks which are identical as to the part which makes connection with the radiator, since the tappings of radiators having lateral connections for vent valves are standard. But when embodied in straight shank valves, there must be three times as many such valves as designs, for each design must be embodied in valves differing from one another in respect to the dimensions of the connecting shank. Thus under the conditions assumed for the present illustrative example, twenty different items in the line of vent valves must be produced and carried in stock.

An important part of my present object is to enable angle type radiator valves having the standard size of nipple connection to be applied in all the conditions where straight shank valves have heretofore been used. This object I have accomplished by providing an adapter having an internal bore opening through one end and closed at the other end, and having a lateral opening near the closed end with provisions for making connection with the shank of an angle valve. The open end is constructed for connection with radiators of the type having a top side opening in register with such opening.

Radiators in a one pipe heating system which have a large surface area in proportion to their internal volume or to the area of their main line connections "work water" during the heating up period. This means that water surges through the radiator into the vent valve and closes the vent port thereof by float action while a considerable quantity of air remains in the radiator. Surging is caused by high-velocity inflow of steam when the radiator is cold enough to cause rapid condensation, which prevents the water of condensation from flowing counter to the steam until the outlet port of the vent valve is closed. When the steam velocity is reduced, due to a stoppage of venting, or heating up of the radiator and consequent less demand for steam, water will flow out of the radiator until enough water has drained from the vent valve casing to cause opening of the discharge port of the latter. Then with resumed escape of air, steam again flows into the radiator at increased velocity and another surge may develop, with repetition of the action just described. With some types of radiator several surges may occur before all of the air is expelled and the radiator is heated to the point where condensation is slow. Radiators of the convector type are especially subject to water surges. Convectors are characterized by heat conducting fins of large surface area surrounding pipes of relatively small volume, and are installed in enclosures which assist in inducing gravity circulation of large volumes of air in contact with the heating surface.

The amount of water which leaves a radiator after a surge is conditioned by the length of time needed to drain the vent valve casing. If all the water leaves the radiator before the vent port opens, a longer period is assured for further venting before the next surge will occur. Radiators can be wholly cleared of air in a less length of time when wholly emptied of water after a surge, so that extended intervals occur between surges, than when the vent port is permitted to open quickly and steam is thereby allowed to flow rapidly into the radiator while water still remains therein.

Another part of my object has been to control the drainage of water from the adapter, and the vent valve and adapter combination, so that time will be afforded after a surge to permit substantially all of the water to leave the radiator by the time the vent port is next opened. This object is accomplished by internal means in the adapter for causing a slow dripping of water therefrom against the forces of capillarity and the internal pressure of the system tending to retain the water in the bore.

For an illustration of the invention in one of its practical embodiments, attention is called to the drawing furnished herewith, in which, Fig. 1 is a side view and Fig. 2 an end view of a radiator of the type known as a convector having applied thereto an adapter and angle valve combination of this invention;

Like reference characters designate the same parts wherever they occur in all the figures.

Figures 1, 2:
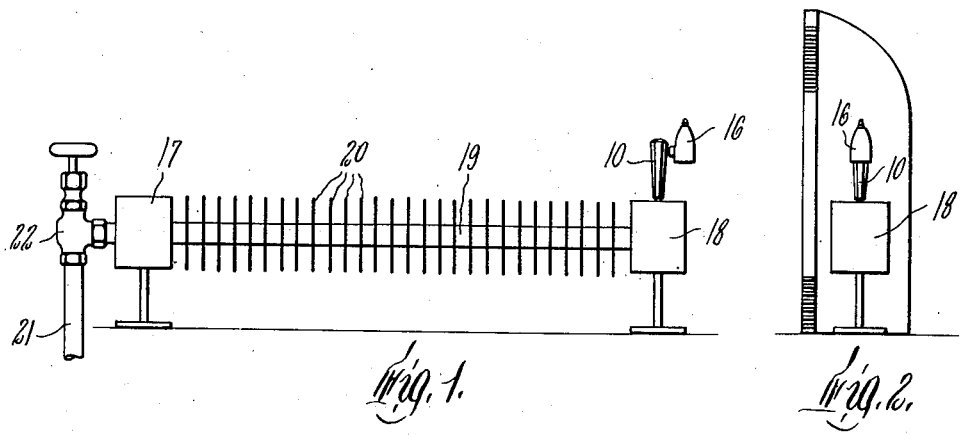

The adapter of this invention consists of an elongated body 10 having an internal bore 11 opening through the end 12. The bore is closed at the opposite end 13 of the adapter and communicates with a lateral opening 14 which is internally tapped to receive the externally threaded nipple connection 15 of the angle type radiator vent valve 16. The end 12 of the adapter is externally threaded to be screwed into the tapped valve connection opening of a radiator of the type heretofore requiring a straight shank valve.

The combination of my adapter with a radiator of the convector type and an angle pattern vent valve is shown in Figs. 1 and 2. The convector consists of headers 17 and 18, a horizontal pipe 19 (or a plurality of such pipes) extending between the headers and fins 20 secured in parallel transverse planes on the pipe 19. A single pipe 21 for conducting steam to the radiator and water away from it is connected to the header 17 through a valve 22. The vent valve adapter is secured to the header 18; that is, the end of the radiator opposite to that connected to the main line.

Adapters essentially like that shown are provided with connecting ends 12 of different diameters to fit the different tappings in radiators or pipe lines provided for mounting air valves in their top walls. On the assumption of the previous illustrative example, that such tappings are made for 1/8", 1/4" and 3/4" shank connections, a total of three adapters is sufficient to mount any design of angle shank valve in connection with such tappings, since all commercial angle valves are made with standard 1/8" threaded connections.

The vent valve 16 here shown is essentially the same as that illustrated in my pending application for United States Patent Serial No. 297,521, filed October 2, 1939, now Patent No. 2,289,218, granted July 7, 1942, entitled Siphonless vent valve. It contains a float 23, which is also a thermostat, having a flexible bottom wall, and carrying on its upper end an upwardly extending valve proper arranged to close and open a vent in the top extremity 25 of the casing. A support 24 in the casing serves as an abutment against which the float bottom reacts to close the vent port when distended by temperature approximating that of live steam, and on which it rests, with the vent open, when the casing is empty of water and the temperature is low enough to cause retraction of the diaphragm. The height of the support with relation to the nipple 15 is such that, when water occupies the casing to the level of the lower side of the nipple passage, the float is nearly or wholly supported by its buoyancy but is not appreciably raised from the support. The valve proper is then located so near to the vent port that rise of the water to a height less than the upper side of the nipple passage suffices to close the port. Hence, when water surges into the casing, it closes the vent before filling the casing, entrapping air which usually holds the water level below the upper side of the nipple passage.

A tongue 26 extends through the nipple passage in a horizontal plane approximately midway between the upper and lower bounds of the passage and has a downwardly curved extremity 27 beyond the end of the nipple. The function of this tongue is to cause dripping of water from the valve casing after the latter has been flooded by a surge and the vent port thereby closed. A film of water then flows along the tongue and gathers in a drop at the extremity of the tongue. When the drop has become large and heavy enough to overcome capillary attraction, it separates from the tongue and falls.

A water leader or conductor 28 is located in the adapter bore to cause outflow of the water at a retarded rate. In the form shown in Figs. 3 and 4, this leader is a strip of sheet metal having a width approximating the diameter of the bore, but enough smaller to fit freely therein in a diametral plane. The upper end of the leader is provided with a latch or hook 29 and pressers 30 to secure it in place against accidental removal. Such latch and pressers are formed by slitting the strip on two parallel lines extending longitudinally from one end so as to form a tongue in the middle, which is bent to one side of the strip, and two marginal tongues which are bent in the opposite direction. The middle tongue is bent sharply outward adjacent to its extremity to provide the latch 29, and the marginal tongues are bent at their extremities in the opposite direction to form the pressers 30. The shoulder of the latch is adapted to pass over and interlock with a shoulder 31 in the bore opposite to the lower side of the tapping 14. The pressers 30 are located at a somewhat lower level so as to press on the side of the bore opposite to shoulder 31 and exert spring pressure to hold the latch in engagement with the shoulder and centralize the strip. The latch has an upward extension 32 of sufficient length to approach close to the end wall of the adapter bore when the latch is properly engaged with the locking shoulder, and to prevent endwise movement of the strip. The strip extends beyond the open end of the adapter into the upper part of the radiator header. Its function and effect is to cause flow of a film of water by gravity along its surfaces from the body of water contained in the bore 11, and gathering of the water in a drop at its lower extremity which, when it becomes heavy enough to overcome capillary attraction, falls into the radiator.

In the operation of the vent valve and adapter combination, when surges occur, the valve casing is filled with entrapped air in its upper portion and water in its lower portion rising to, or somewhat above, the level which raises the float to close the valve; and the bore of the adapter is mainly filled with water and contains air entrapped in the upper extremity of the bore. When the water does not rise high enough in the valve casing to block the nipple passage, there is a direct continuity between the air pocket in the head of the adapter and the air space in the valve casing. In these circumstances the water which is held in the adapter bore by the combined action of capillarity and the superiority of vapor pressure in the heating system over the partial vacuum in the valve casing, gradually runs down and drips from the end of the leader strip 28. When a few drops have fallen, a bubble of air passes through the bore to fill the space provided by the outgoing water. Water likewise drips from the tongue 27 and air passes into the casing to take the place of the released water. A slow drainage of water thus occurs, which eventually lowers the water level in the valve casing enough to reopen the vent. The rate of drainage is established by the diameter of the bore 11 and length of the protruding end of the water leader, with relation to the quantity of water which enters the vent valve when a surge occurs; whereby to cause drainage of the valve casing to the point where the valve will be opened, in approximately the time needed for the water which has entered the radiator during its surge to run out. Not only does the adapter enable angle type valves to be installed where they could not be previously, but it has a cooperative effect with the valve in effecting further and better control of the rate of drainage from the valve after surges.

The improvement in the heating up action of radiators which work water, by means of the adapter over straight shank valves previously used in similar situations, is that the retarded drainage causes fewer water surges to occur and so affords longer uninterrupted periods of venting, which permits the radiator to be cleared of air and heated in a shorter time than is needed when such radiators are equipped with straight shank valves.

Figures 3, 4, 5:
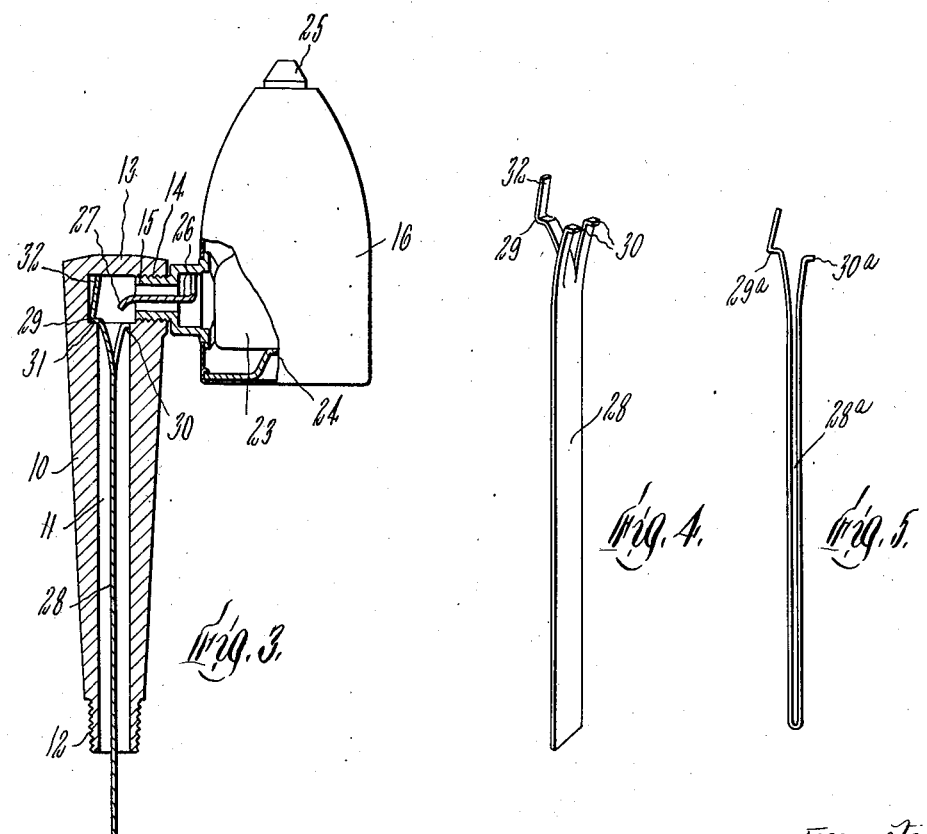
Fig. 3 is a sectional view of the adapter shown in the preceding figures and a part section and part elevation of a vent valve in cooperative combination with the adapter.
Fig. 4 is a perspective view of the water leader shown in Fig. 3 with which the adapter is equipped to cause dripping of water from the bore of the adapter while the casing of the vent valve is being drained.
Fig. 5 is a side elevation of another form of water leader equivalent to that shown in Figs. 3 and 4.

A water leader of different construction but equivalent to that just described is shown in Fig. 5, designated by the character 28a. This embodiment is made of a piece of spring wire bent in the middle to form an elongated U with legs near enough together to pass freely into the bore of the adapter. The extremities of these legs are bent outwardly to form a latch shoulder 29a and presser 30a, and the portions adjacent to the extremities are inclined outwardly to the extent that the latch and presser, when the leader is free from restraint or external stress, are separated farther than the width of the adapter bore, as is the case with the form first described. In both embodiments the latch and presser are brought nearer together in being passed into the adapter and are so constrained by the walls of the bore until the latch passes the shoulder 31. Then the latch springs outward by the resilience of the material of the water leader and overlaps shoulder 31.

The principles of the invention are applicable to adapters designed for use with steam radiators of all types, and steam pipes, which have vent valve connections in their top sides, whether such connections are made as tapped holes or otherwise. Hence the term "radiator" as used in this description and in the following claims is to be construed, not in a restricted sense, but as embracing or typifying any part of a steam heating system in which air may collect when the steam is shut off, and from which air must be discharged through a vent valve when steam is admitted.

What I claim and desire to secure by Letters Patent is:

1. The combination of an adapter for a radiator vent valve having an internal bore with an opening through one end and another opening in the side near the opposite end, and a vent valve having a lateral nipple secured to the adapter in communication with the side opening thereof, the length of the adapter being greater than the length of the vent valve, and a plate-like partition dividing the lateral nipple of the vent valve into two substantially semi-circular passages, one above the other, and a plate-like partition in the adapter dividing the bore of the adapter into two corresponding semi-circular vertical passages.

2. An adapter of the character set forth, having a bore extending through one end and closed at the other end and a lateral opening into the bore adjacent to the closed end thereof, a water leader extending through said bore and dividing it into two substantially equal semi-circular passages and protruding from its open end and having a latch and a presser resiliently forced apart from one another into overlapping engagement of the latch with an internal shoulder in the bore.

3. A vent valve and adapter combination consisting of a valve casing having a vent port in its upper part, a nipple projecting laterally from one side and having a partition plate therein and projecting from the end thereof and an internal float-supported valve element for closing and opening said port when water rises and descends in the casing, an adapter having an opening in one side receiving said nipple in water-tight connection and a longitudinal bore extending through the adapter from said opening to one end thereof at a distance from said opening greater than the height of said valve casing, and a water leader mounted within said bore and protruding from the end thereof remote from the lateral opening, and cooperating with the projecting end of the partition plate in said valve nipple.

4. A vent valve and adapter combination comprising an adapter body having a longitudinal bore opening through one end and closed at the other end of the body, and having a lateral opening entering the side of said bore, and a vent valve comprising a casing having a lateral nipple connected in register with the side opening of the adapter in a horizontal line when the combination is in position for use, and a vent port in the upper part of the vent valve, a tongue extending through the nipple passage horizontally and protruding therefrom into the adapter bore with a downward inclination of its protruding end, and a float-supported valve member cooperating with said port to close and open the same when water rises and descends in the casing, and a water leader in the longitudinal bore of the said adapter substantially in line with the downwardly inclined end of said tongue.

5. The combination of an adapter and vent valve of the type described for use in a steam heating system comprising a vent valve having a venting opening and a float valve therein adapted to close the venting opening and having a laterally projecting side nipple having a passage therethrough, and means dividing said passage into an upper and lower portion, and an adapter having a passage comprising a lateral bore and a longitudinal bore, said adapter passage communicating with said nipple passage, said adapter being longer in its longitudinal bore than in its lateral bore, and means dividing the longitudinal bore of the adapter into two portions substantially registering with the upper and lower passage portions in the vent valve nipple.

6. The combination of an adapter and a vent valve of the type described for use in a steam heating system comprising a vent valve having a venting opening and having a laterally projecting side nipple having a passage therethrough and means in said passage for facilitating the simultaneous flow of steam or air and water therethrough in opposite directions, and an adapter having a passage comprising a longitudinal bore and a lateral bore in communication with said nipple passage, said adapter being longer in its longitudinal bore than in its lateral bore, and means in said longitudinal bore of the adapter for facilitating the simultaneous flow of steam or air and water therethrough in opposite directions, said means cooperating with the means for facilitating the flow of steam or air and water through the valve nipple.

WILLIAM K. SIMPSON.